(12) United States Patent
Miyamae et al.

(10) Patent No.: US 12,267,430 B2
(45) Date of Patent: Apr. 1, 2025

(54) COMPUTER-READABLE RECORDING MEDIUM STORING INFORMATION CONCEALING PROGRAM, METHOD OF CONCEALING INFORMATION, AND INFORMATION MANAGEMENT APPARATUS

(71) Applicant: Fujitsu Limited, Kawasaki (JP)

(72) Inventors: Takeshi Miyamae, Kawasaki (JP); Song Hua, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 185 days.

(21) Appl. No.: 18/200,611

(22) Filed: May 23, 2023

(65) Prior Publication Data

US 2024/0048386 A1    Feb. 8, 2024

(30) Foreign Application Priority Data

Aug. 8, 2022 (JP) .................. 2022-126360

(51) Int. Cl.
*H04L 9/32* (2006.01)
*H04L 9/08* (2006.01)

(52) U.S. Cl.
CPC .......... *H04L 9/3221* (2013.01); *H04L 9/0869* (2013.01)

(58) Field of Classification Search
CPC .................. H04L 9/0869; H04L 9/3221
See application file for complete search history.

(56) References Cited

U.S. PATENT DOCUMENTS 10,735,205 B1 * 8/2020 Wentz .................. H04L 9/3257
11,232,439 B2 * 1/2022 Westland ............. G06Q 20/383

(Continued)

FOREIGN PATENT DOCUMENTS

JP    2009-508430 A    2/2009
JP    2020-503784 A    1/2020
(Continued)

OTHER PUBLICATIONS

Malik, Sidra et al., "PrivChain: Provenance and Privacy Preservation in Blockchain enabled Supply Chains", ARXIV.Org, Cornell University Library, 201 Olin Library Cornell University Ithaca, NY 14853, Apr. 27, 2021, XP081945449, pp. 2-14.

(Continued)

*Primary Examiner* — Gary S Gracia
(74) *Attorney, Agent, or Firm* — Fujitsu Intellectual Property Center

(57) ABSTRACT

A computer-readable medium storing a program for causing a computer to execute processing in one of stages of a supply chain, the processing including: obtaining, from an immediately upstream stage, a first cumulative value being from a most upstream stage to the immediately upstream stage and a first random number used to generate a first commitment obtained by concealing the first cumulative value; generating, based on the first random number, a link commitment obtained by concealing information indicating a relationship between the immediately upstream stage and the stage; calculating, based on the first cumulative value, a second cumulative value being from the most upstream stage to the stage; generating a proof indicating that the second cumulative value is calculated using the correct first cumulative value and that is a zero-knowledge proof based on the link commitment; and causing the link commitment and the proof to be recorded in a blockchain.

6 Claims, 5 Drawing Sheets

(56) References Cited

U.S. PATENT DOCUMENTS

| | | | | |
|---|---|---|---|---|
| 2008/0256600 | A1* | 10/2008 | Schrijen | H04L 9/3218 |
| | | | | 726/2 |
| 2011/0208560 | A1* | 8/2011 | Najmi | G06Q 10/06 |
| | | | | 705/7.31 |
| 2019/0268312 | A1* | 8/2019 | Ma | H04L 63/0435 |
| 2019/0332807 | A1* | 10/2019 | LaFever | H04L 63/0407 |
| 2019/0349426 | A1* | 11/2019 | Smith | H04L 9/3239 |
| 2020/0120074 | A1* | 4/2020 | Ma | H04L 63/0435 |
| 2020/0334708 | A1* | 10/2020 | Knox | G06Q 20/123 |
| 2021/0158039 | A1* | 5/2021 | Dittmann | H04L 9/3278 |
| 2022/0038289 | A1* | 2/2022 | Huang | H04L 63/126 |
| 2022/0051261 | A1* | 2/2022 | Vetas | G06Q 30/018 |
| 2022/0284446 | A1* | 9/2022 | Kind | G06Q 30/018 |
| 2024/0056304 | A1* | 2/2024 | Miyamae | H04L 9/50 |

FOREIGN PATENT DOCUMENTS

| | | | |
|---|---|---|---|
| WO | 2018/125989 | A2 | 7/2018 |
| WO | 2021/211814 | A1 | 10/2021 |

OTHER PUBLICATIONS

Bunz, Benedikt al., "Proof-Carrying Data from Accumilation Schemes", IACR, International Association for Cryptogogic Research, vol. 20200525: 165132, May 25, 2020, pp. 1-54, XP061035891.

Extended European Search Report dated Dec. 14, 2023 for corresponding European Patent Application No. 23174761.9, 7 pages.

\* cited by examiner

COMPUTER-READABLE RECORDING MEDIUM STORING INFORMATION CONCEALING PROGRAM, METHOD OF CONCEALING INFORMATION, AND INFORMATION MANAGEMENT APPARATUS

CROSS-REFERENCE TO RELATED APPLICATION

This application is based upon and claims the benefit of priority of the prior Japanese Patent Application No. 2022-126360, filed on Aug. 8, 2022, the entire contents of which are incorporated herein by reference.

FIELD

The embodiment discussed herein is related to a computer-readable recording medium storing an information concealing program, a method of concealing information, and an information management apparatus.

BACKGROUND

Today, it is known that a distributed ledger technique using a blockchain and a technique of managing a smart contract in which transaction conditions are described in the distributed ledger are applied to traceability management in a supply chain. A virtual economic zone by intangible value distribution employing such a mechanism is referred to as, for example, a social chain.

Nowadays, environmental problems such as climate change, industrial water pollution, and use of a large amount of water are discussed, and it is desired that participants of the supply chain encourage a consciousness change and transformation of behavior in order to reduce environmental loads. Accordingly, efforts are being made to realize the virtual economic zone that enriches the world by indexing activities that have not been recognized as values so far and distributing the values. For example, information such as $CO_2$ emissions in individual stages of a supply chain is included in a commodity as a token of the intangible value and circulated in the entire supply chain from a maker to a vendor and from the vendor to consumers. When such a social chain is used, corporations and consumers change their behaviors so as to produce better results for the environment and the entire society by the dynamics of the virtual economy with, for example, transactions that evaluate the intangible value.

However, the supply chain has a problem in that it is difficult for the consumer who wants to purchase a product good for the environment even at a slightly higher price to understand with what kind of environmental contribution the product to be purchased is manufactured. There is an other problem with the supply chain in that it is difficult for corporations to collect costs of environmental contribution such as reduction of $CO_2$ emissions and use of ecological materials without imbalance between the corporations, and thereby continuous environmental contribution is unlikely to be achieved.

Accordingly, it has been studied to solve these problems from the following two viewpoints in the social chain. One of the viewpoints is a technique to visualize the intangible value for distribution. For example, a trail management technique to visualize the intangible value generated by the supply chain may evoke consumers' interest in the intangible value. A token generation technique to generate a token based on trail information may provide consumers and investors with an opportunity to invest in the intangible value. The other viewpoint is a technique for appropriate consideration return of the intangible value. For example, with a consideration return technique that distributes the token based on the trail information, appropriate consideration return for the intangible value to the supplier may be realized.

As a mechanism based on these two viewpoints, a mechanism has been proposed in which the consideration corresponding to the intangible value is returned from the consumer to the supply chain, and this consideration is distributed in accordance with the value of each stage in the supply chain by using the smart contract managed in the blockchain.

As a technique related to the supply chain, a technique has been proposed in which a transaction face value is committed on the transmission side and legitimacy is verified on the receiver side by using a factor and a symmetric key provided at the time of the commit. Also, a technique has been proposed in which a relay station of a mesh network of Internet-of-Things (IoT) terminals is coupled while being hidden, and coupling confirmation is performed based on a key using a random number and a zero-knowledge proof. Also, a technique to verify the authenticity of an item by using a zero-knowledge protocol for a commitment with a random number generated from a physical uncloneable key has been proposed.

U.S. Patent No. 2020/0120074, Japanese National Publication of International Patent Application No. 2020-503784, and Japanese National Publication of International Patent Application No. 2009-508430 are disclosed as related art.

SUMMARY

According to an aspect of the embodiments, there is provided a non-transitory computer-readable recording medium storing an information concealing program for causing a computer to execute processing in a predetermined stage of a plurality of stages included in a supply chain, the processing including: obtaining, from an immediately upstream stage, a first random number and a first cumulative value, the first random number being a random number used to generate a first cumulative value commitment, the first cumulative value commitment being a cumulative value commitment obtained by concealing the first cumulative value that is from a most upstream stage to the immediately upstream stage; generating, based on the first random number, an upstream component link commitment information obtained by concealing information indicative of a relationship between the immediately upstream stage and the predetermined stage; calculating, based on the first cumulative value, a second cumulative value that is from the most upstream stage to the predetermined stage; generating a cumulative value calculation proof information that indicates that the second cumulative value is calculated by using the correct first cumulative value and that is a zero-knowledge proof based on the upstream component link commitment information; and causing the upstream component link commitment information and the cumulative value calculation proof information to be recorded in a blockchain.

The object and advantages of the invention will be realized and attained by means of the elements and combinations particularly pointed out in the claims.

DESCRIPTION OF EMBODIMENTS

However, in the supply system that distributes the consideration by using the smart contract managed in the blockchain, topology information of the supply chain representing the relationship between components or the like may be disclosed to an unidentified number of participants. This leads to a risk that the scale of the supply chain is estimated, and further, in combination with an analysis of the network layer, even the relationship between the suppliers may be traced. As described above, in the supply chain system of related art, it is difficult to protect privacy in the supply chain related to each supplier and the entire supply chain.

The disclosed technique is made in view of the above-described circumstances and is aimed at providing an information concealing program, a method of concealing information, and an information management apparatus that protect privacy in a supply chain.

Hereinafter, an embodiment example of an information concealing program, a method of concealing information, and an information management apparatus disclosed herein will be described in detail with reference to the drawings. The following embodiment example does not limit the information concealing program, the method of concealing information, and the information management apparatus disclosed herein.

Embodiment Example

Figure 1:
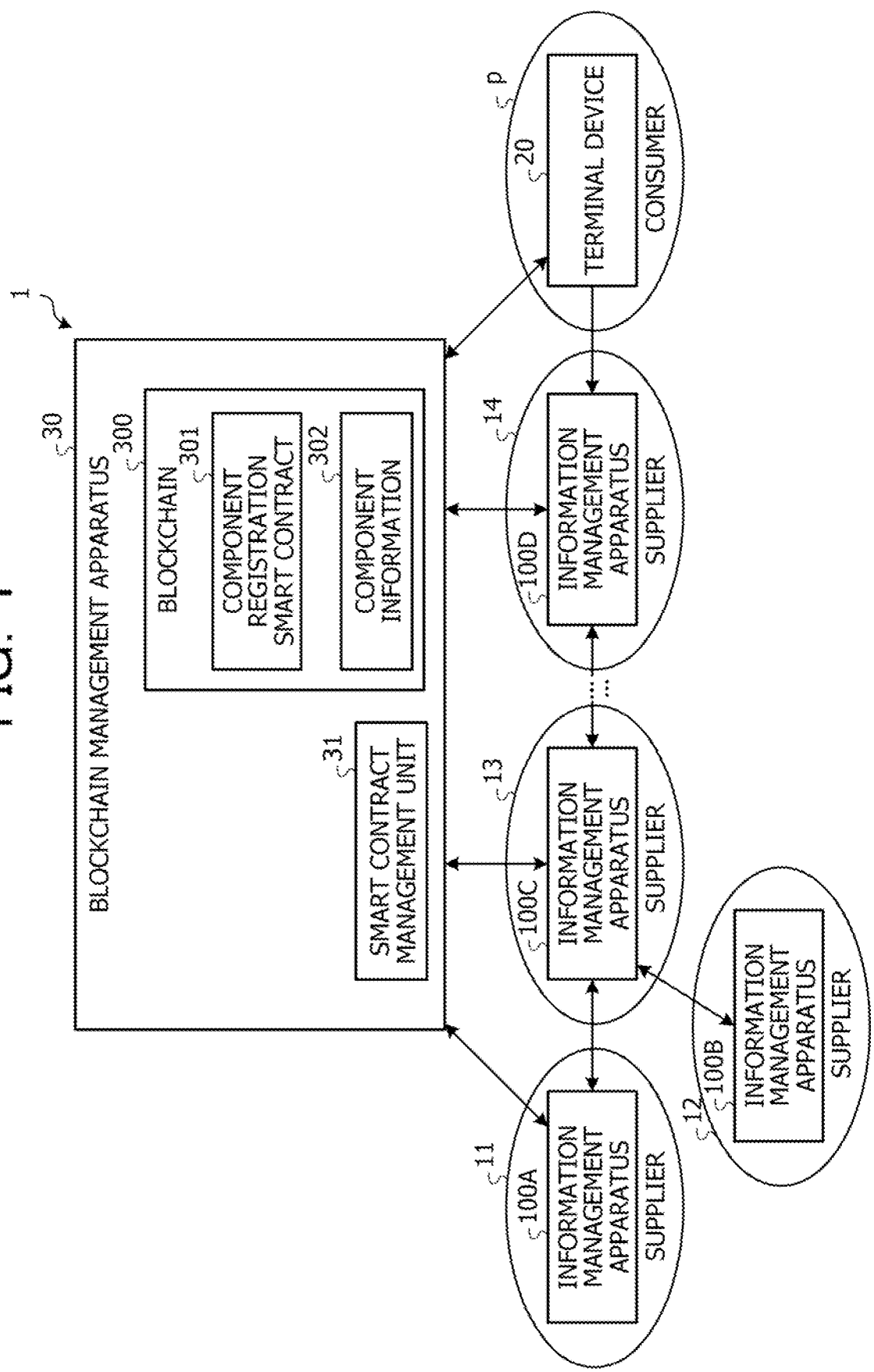
FIG. 1 is a diagram illustrating an example of a system configuration of a supply chain system.

FIG. 1 is a diagram illustrating an example of a system configuration of a supply chain system. A supply chain system 1 according to the present embodiment example includes information management apparatuses 100A to 100D respectively owned by the suppliers 11 to 14, a terminal device 20 owned by a consumer P, and a blockchain management apparatus 30. In the following description, in a case where the suppliers 11 to 14 are not distinguished from each other, the suppliers 11 to 14 are referred to as suppliers 10. In a case where the information management apparatuses 100A to 100D owned by the suppliers 10 are not distinguished from each other, the information management apparatuses 100A to 100D are referred to as information management apparatuses 100. Hereinafter, in a supply chain, a stage (component) upstream of a certain stage (component) may be referred to as an upstream stage (upstream component), and a stage (component) downstream of the certain stage (component) may be referred to as a downstream stage (downstream component).

The information management apparatuses 100 and the terminal device 20 are communicably coupled to the blockchain management apparatus 30 via a network. For example, the suppliers 10 in transaction relationship with each other in the supply chain, for example, the supplier 11 and the supplier 13, the supplier 12 and the supplier 13, and the supplier 13 and the supplier 14 have communication channels for direct transmission and reception of data to and from each other. For example, the information management apparatus 100A and the information management apparatus 100C, the information management apparatus 100B and the information management apparatus 100C, and the information management apparatus 100C and the information management apparatus 100D are coupled via the network. A communication channel for direct transmission and reception of the data exists between the most downstream stage supplier 14 and the consumer P. For example, the information management apparatus 100D and the terminal device 20 are coupled to each other via the network.

Although four suppliers 11 to 14 and four information management apparatuses 100A to 100D are illustrated as examples in FIG. 1, the number of suppliers 10 or the number of information management apparatuses 100 is not specifically limited. A route of the supply chain may branch or does not necessarily branch.

Even in a case where stage-by-stage trail information of a certain product in the supply chain related to the product and topology information of the supply chain are concealed, the supply chain system 1 according to the present embodiment proves legitimacy of a stage-by-stage cumulative value.

For example, the supply chain system 1 proves the legitimacy of the cumulative value in each of the suppliers 10 in a state in which the trail information managed by the supplier 10 and the topology information of the supply chain are concealed. For example, the legitimacy of the cumulative value is referred to when a consideration returned with respect to the value of the product is distributed to the supplier 10 of each component included in the product.

The supply chain according to the present embodiment means a series of processes from procurement of raw materials and components of a product in manufacturing stages to production, inventory management, sales, and delivery. The value of each component of the product manufactured by the supply chain according to the present embodiment is an example of a value of a stage of manufacturing the component out of the manufacturing stages included in the supply chain. The value of the component according to the present embodiment is an example of an environmental value generated in the manufacturing stages of the component. The environmental value may be, for example, an index indicating the degree of contribution to environmental maintenance or reduction in environmental load.

The consumer P receives supply of the product manufactured by the supply chain. The consumer P pays the consideration for the product and the cumulative value supplied by using the terminal device 20. The cumulative value has been added to the product and includes an accumulated intangible value. The paid consideration is paid by being distributed to each of the suppliers 10.

The blockchain management apparatus 30 is an apparatus that manages a distributed ledger included in the supply chain system 1 and includes a plurality of devices coupled to each other by a peer-to-peer (P2P) method. The blockchain management apparatus 30 includes a smart contract management unit 31 and a blockchain 300. The smart contract management unit 31 manages a smart contract stored in the blockchain 300.

A component registration smart contract 301 and component information 302 are stored in the blockchain 300. The component registration smart contract 301 is a program executed by the smart contract management unit 31. In response to a request from the information management apparatus 100, the component registration smart contract 301 stores in the blockchain 300 the component information 302 related to the component manufactured by the supplier 10 owning the information management apparatus 100.

For example, the component registration smart contract 301 receives from the information management apparatus 100 a registration request for a cumulative value proof, a cumulative value commitment, an upstream component link commitment, and a cumulative value calculation proof. The cumulative value of the component is the cumulative value from the supplier 10 of the most upstream stage to the supplier 10 that has manufactured the component. The cumulative value proof is a zero-knowledge proof that proves the legitimacy of the cumulative value of the component manufactured by the supplier 10 owning the information management apparatus 100. The cumulative value commitment is a value calculated by using a predetermined commitment function for the cumulative value and is information which is obtained by concealing the cumulative value and the content of which is set to be unchangeable. The upstream component link commitment is information which is obtained by concealing information on a link to a component at an immediately upstream stage and the content of which is set to be unchangeable. The upstream component link commitment is a value calculated by using a predetermined commitment function. The cumulative value calculation proof is the zero-knowledge proof of the fact that the cumulative value of its own component has been calculated based on the cumulative value of the correct upstream component and is information that proves the legitimacy of the calculation of the cumulative value of its own component.

Upon receiving the registration request from the information management apparatus 100, the component registration smart contract 301 verifies the upstream component link commitment, the cumulative value proof, and the cumulative value calculation proof. The component registration smart contract 301 verifies that the cumulative value proof and the cumulative value calculation proof are true and that the upstream component link commitment is not registered in an upstream component link commitment list. The upstream component link commitment list is a list of upstream component link commitments that have already registered in the blockchain 300.

When the cumulative proof is true, it is ensured that the cumulative value is a legitimate value from the cumulative value commitment and the cumulative value proof, and the component registration smart contract 301 may confirm that the cumulative value is a legitimate value. When the cumulative value calculation proof is true, it is ensured that the calculation of the cumulative value is correct from the upstream component link commitment and the cumulative value calculation proof, and the component registration smart contract 301 may confirm the legitimacy of the calculation of the cumulative value.

After that, the component registration smart contract 301 registers in the blockchain 300 the cumulative value proof, the cumulative value commitment, the cumulative value calculation proof, and the upstream component link commitment as the component information 302. The details of the cumulative value proof, the cumulative value commitment, the cumulative value calculation proof, and the upstream component link commitment will be described later.

Figure 2:
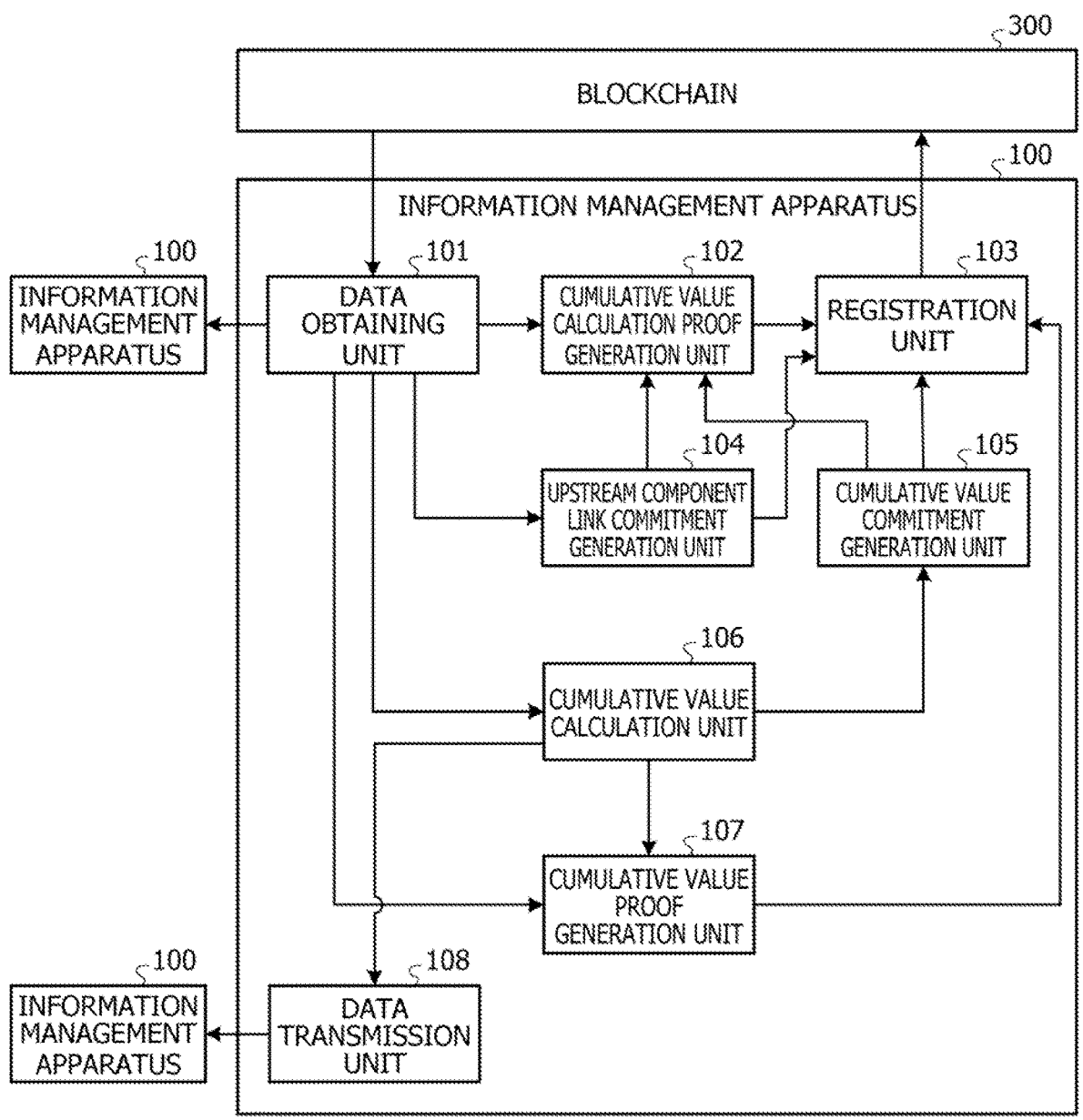
FIG. 2 is a block diagram of an information management apparatus.

FIG. 2 is a block diagram of the information management apparatus. Next, referring to FIG. 2, the details of the information management apparatus 100 will be described. As illustrated in FIG. 2, the information management apparatus 100 includes a data obtaining unit 101, a cumulative value calculation proof generation unit 102, a registration unit 103, an upstream component link commitment generation unit 104, a cumulative value commitment generation unit 105, a cumulative value calculation unit 106, a cumulative value proof generation unit 107, and a data transmission unit 108.

For example, the data obtaining unit 101 obtains the cumulative value of the upstream suppliers which is the cumulative value from the supplier 10 at the most upstream stage to the supplier 10 at the immediately upstream stage. This cumulative value of the upstream suppliers is an example of a "first cumulative value". Hereinafter, the cumulative value from the supplier 10 at the most upstream stage to the supplier 10 at the stage of itself is simply referred to as a "cumulative value".

The data obtaining unit 101 obtains a random number generated by the information management apparatus 100 of the immediately upstream supplier 10. The random number generated by the information management apparatus 100 of the immediately upstream supplier 10 is an example of a "first random number" and is hereinafter referred to as an "upstream random number".

When the information management apparatuses 100 are coupled to each other via the network, the data obtaining unit 101 may obtain the cumulative value and the upstream random number via the network. Alternatively, the data obtaining unit 101 may receive input from an operator of the supplier 10 who has obtained these pieces of information via an other communication channel.

Next, the data obtaining unit 101 confirms that the cumulative value commitment, the cumulative value proof, the upstream component link commitment, and the cumulative value calculation proof which have been generated by the information management apparatus 100 at the immediately upstream stage have been registered in the blockchain 300. The data obtaining unit 101 obtains all the cumulative value commitments already registered in the blockchain 300 from the blockchain 300. Hereinafter, the cumulative value commitments already registered in the blockchain 300 are referred to as "existing cumulative value commitments". The cumulative value commitment of the immediately upstream stage is referred to as an "upstream cumulative value commitment". For example, the existing cumulative value commitments at least include the upstream cumulative value commitment. The upstream cumulative value commitment is data generated by using the upstream random number. This upstream cumulative value commitment is an example of a "first cumulative value commitment".

The data obtaining unit 101 has trail information of its own stage. The trail information is a trail indicating that the stage has been performed and includes various types of values measured at its own stage. For example, the trail information includes information indicating environmental values such as a power consumption reduction amount that is the amount of power having been reduced this time to manufacture the product compared to that to manufacture the same component last time, the performance and the durability of the component, and so forth. A single-unit value is determined in the stage performed by the supplier 10 of its own stage. The trail information includes an electronic signature of a device or the like that has generated the trail information. When the electronic signature is included, the trail information is proved to be correct information.

Next, the data obtaining unit 101 outputs the upstream random number to the upstream component link commitment generation unit 104. The data obtaining unit 101 also outputs the trail information and the cumulative value of the upstream suppliers to the cumulative value calculation unit 106. The data obtaining unit 101 also outputs the trail information, the cumulative value of the upstream suppliers, and the upstream random number to the cumulative value proof generation unit 107. The data obtaining unit 101 also outputs the upstream random number and the existing cumulative value commitments to the cumulative value calculation proof generation unit 102.

The upstream component link commitment generation unit 104 generates the upstream component link commitment obtained by concealing information indicating a link between its own stage and the supplier 10 that supplies the component to its own supplier 10 and that is at the immediately upstream stage. For example, the upstream component link commitment generation unit 104 uses the upstream random number obtained from the data obtaining unit 101 as an input value to generate the upstream component link commitment by using the commitment function. The upstream component link commitment is characterized as being unchangeable. The upstream component link commitment generation unit 104 outputs the generated upstream component link commitment to the cumulative value calculation proof generation unit 102 and the registration unit 103. The upstream component link commitment generation unit 104 generates the upstream component link commitments for upstream components used at its own stage on an upstream component-by-upstream component basis.

The cumulative value calculation unit 106 receives input of the trail information and the cumulative value of the upstream suppliers from the data obtaining unit 101. With authentication information, the cumulative value calculation unit 106 calculates the single-unit value of the stage of component manufacturing performed by the supplier 10 of its own stage.

Next, the cumulative value calculation unit 106 calculates the cumulative value by adding together the calculated single-unit value and the cumulative value of the upstream suppliers. This cumulative value is an example of a "second cumulative value". After that, the cumulative value calculation unit 106 outputs the calculated cumulative value to the cumulative value commitment generation unit 105 and the cumulative value proof generation unit 107.

The cumulative value calculation unit 106 generates the random number for the calculated cumulative value. This random number is an example of a "second random number". The cumulative value calculation unit 106 outputs the generated random number to the cumulative value commitment generation unit 105 and the cumulative value proof generation unit 107. The cumulative value calculation unit 106 also outputs the calculated cumulative value and random number to the data transmission unit 108.

The cumulative value commitment generation unit 105 uses the cumulative value and the random number input from the cumulative value calculation unit 106 as input to generate the cumulative value commitment by using a commit function. The cumulative value commitment is information on the concealed cumulative value and is characterized as being unchangeable. The cumulative value commitment generation unit 105 outputs the generated cumulative value commitment to the cumulative value calculation proof generation unit 102 and the registration unit 103. This cumulative value commitment generated by the cumulative value commitment generation unit 105 is an example of a "second cumulative value commitment".

The cumulative value proof generation unit 107 generates the cumulative value proof that is the zero-knowledge proof that proves that the cumulative value calculated by the cumulative value calculation unit 106 is a legitimate value. The zero-knowledge proof is a technique for proving that "a proposition is true" without notifying information other than "the proposition is true". For example, this cumulative value proof makes it possible, in a state in which the cumulative value in the specific supplier 10 is unknown, to verify that the cumulative value is a legitimate value from the cumulative value proof and the cumulative value commitment generated from information that only the specific supplier 10 knows. The cumulative value proof calculated here is the zero-knowledge proof based on the second cumulative value commitment which indicates the legitimacy of the second cumulative value.

For example, the cumulative value proof generation unit 107 generates the cumulative value proof by using the trail information, the cumulative value of the upstream suppliers, the upstream random number, and the random number obtained from the cumulative value calculation unit 106. After that, the cumulative value proof generation unit 107 outputs the generated cumulative value proof to the registration unit 103. Also, the cumulative value proof generation unit 107 outputs the generated random number to the data transmission unit 108.

The cumulative value calculation proof generation unit 102 receives input of the upstream random number and the existing cumulative value commitments from the data obtaining unit 101. The cumulative value calculation proof generation unit 102 also receives input of the upstream component link commitment from the upstream component link commitment generation unit 104. The cumulative value calculation proof generation unit 102 further receives input of the cumulative value commitment obtained by concealing the cumulative value from the cumulative value commitment generation unit 105.

The cumulative value calculation proof generation unit 102 generates the cumulative value calculation proof that is the zero-knowledge proof of the fact that the cumulative value of its own stage has been calculated based on the cumulative value of the correct upstream component. For example, the cumulative value calculation proof generation unit 102 sets the upstream random number as a concealing argument of the cumulative value calculation proof. The cumulative value calculation proof generation unit 102 sets the upstream component link commitment, each existing cumulative value commitment, and the cumulative value commitment generated by the cumulative value commitment generation unit 105 as public arguments of the cumulative value calculation proof. The cumulative value calculation proof generation unit 102 generates the zero-knowledge proof that proves that the upstream component link commitment is generated from the upstream random number and that any one of the existing cumulative value commitments is generated from the upstream random number, and sets the zero-knowledge proof as the cumulative value calculation proof.

For example, this cumulative value calculation proof makes it possible, while its upstream component link commitment remains concealed, to verify that the cumulative value commitment generated by using the same random number as that of the generated upstream component link commitment exists in the existing cumulative value commitments. In a case where this cumulative value calculation proof is used, the correctness of the calculation of the cumulative value calculated by the its own apparatus may be proved by disclosing a simple list of the cumulative value commitments in a state in which a link between the cumulative value commitments is hidden. The link between the cumulative value commitments corresponds to a parent-child relationship between components in the supply chain, and when the link is concealed, topology information of the supply chain is concealed.

The registration unit 103 receives input of the cumulative value commitment from the cumulative value commitment generation unit 105. The registration unit 103 also receives input of the cumulative value proof from the cumulative value proof generation unit 107. The registration unit 103 also receives input of the upstream component link commitment from the upstream component link commitment generation unit 104. The registration unit 103 further receives input of the cumulative value calculation proof from the cumulative value calculation proof generation unit 102.

The registration unit 103 executes a component transaction with the cumulative value commitment, the cumulative value proof, the upstream component link commitment, and the cumulative value calculation proof set as arguments. Thus, the registration unit 103 collectively registers, in the blockchain 300, the cumulative value commitment, the cumulative value proof, the upstream component link commitment, and the cumulative value calculation proof.

The data transmission unit 108 receives input of the random number used for generating the cumulative value commitment and the cumulative value from the cumulative value calculation unit 106. In a case where the information management apparatuses 100 are coupled to each other via the network, the data transmission unit 108 transmits the cumulative value and the random number to the information management apparatus 100 of the immediately downstream stage via the network.

Figure 3:
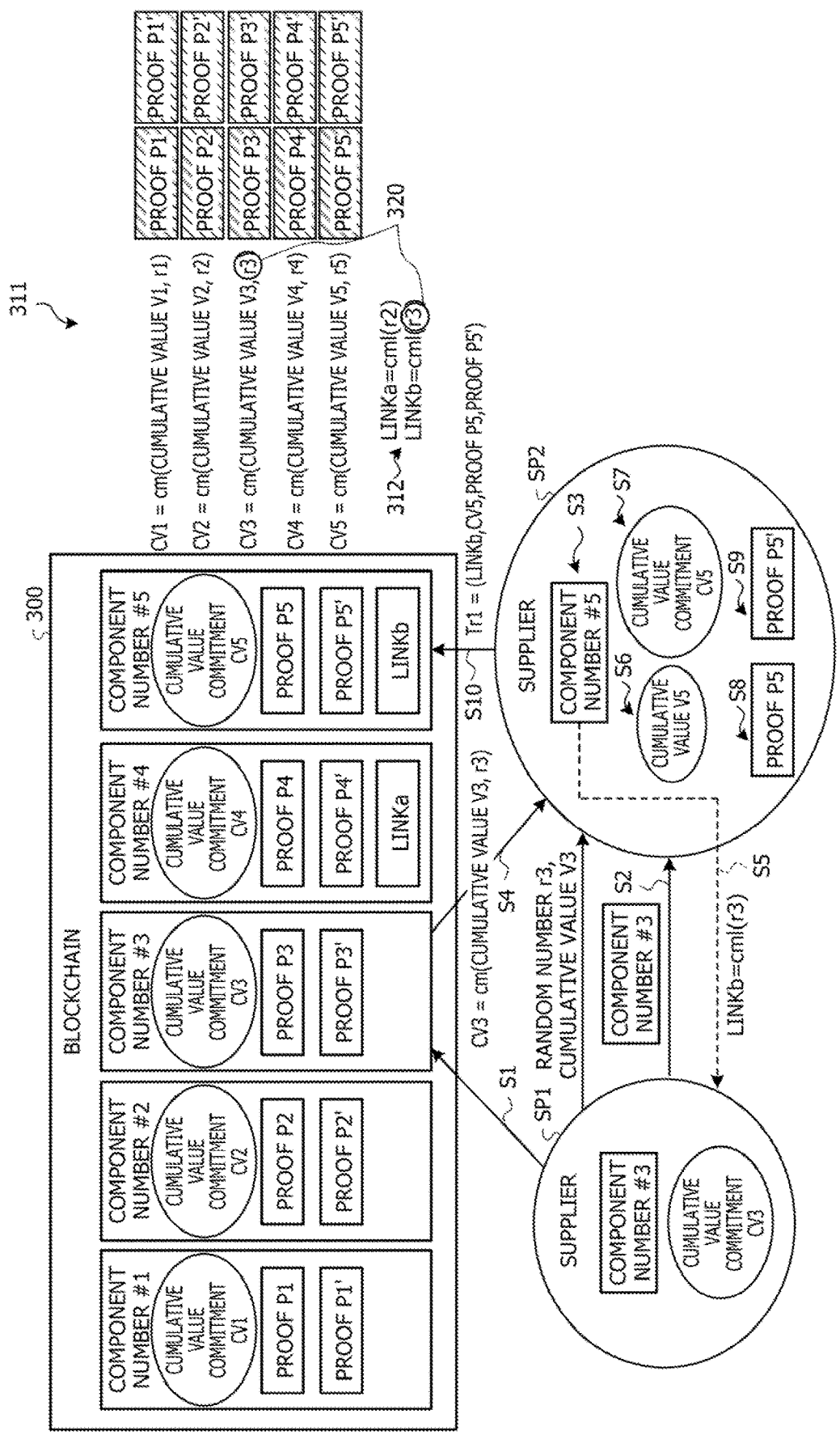
FIG. 3 is a diagram illustrating an outline of a topology information concealing process.

FIG. 3 is a diagram illustrating an outline of a topology information concealing process. Next, referring to FIG. 3, the outline of the topology information concealing process in the supply chain system 1 according to the embodiment example will be described. Here, the topology information concealing process performed by a supplier SP2 will be described. A supplier SP1 is a supplier 10 at a stage immediately upstream of the supplier SP2.

The supplier SP1 manufactures a component of a component number #3. The cumulative value of the component of the component number #3 is a cumulative value V3. The information management apparatus 100 of the supplier SP1 registers the component information 302 of the component number #3 in the blockchain 300 (step S1). The component information 302 of the component number #3 includes a cumulative value commitment CV3, a proof P3 that is the cumulative value proof for the cumulative value commitment CV3, and a proof P3' that is a cumulative value calculation proof. Similarly, the component information 302 of the component numbers #1, #2, and #4 has been already registered in the blockchain 300.

The supplier SP1 supplies the component of the component number #3 to the supplier SP2 (step S2). The supplier SP2 manufactures a component of a component number #5 by using the supplied component of the component number #3 (step S3). In this case, the stage of manufacturing the component number #5 has a link to the component number #3.

Next, the information management apparatus 100 of the supplier SP2 obtains the cumulative value commitment CV3 generated in the supplier SP1 from the blockchain 300 (step S4). The cumulative value commitment CV3 is a value generated by using the commitment function with the cumulative value V3 and a random number r3 as input and represented as CV3=cm (cumulative value V3, random number r3). Here, cm represents the commitment function. The information management apparatus 100 of the supplier SP2 receives the random number r3 from the information management apparatus 100 of the supplier SP1. The information management apparatus 100 of the supplier SP2 receives the cumulative value of the upstream suppliers from the information management apparatus 100 of the supplier SP1.

Next, the information management apparatus 100 of the supplier SP2 uses a commitment function cml for the random number r3 to generate an upstream component link commitment LINKb=cml(r3) which is obtained by concealing information on the relationship between the component of the component number #5 and the cumulative value commitment CV3 (step S5). Thus, information indicating that the component of the component number #5 has been manufactured by using the component of the component number #3 is concealed.

Next, the information management apparatus 100 of the supplier SP2 calculates the single-unit value of a manufacturing stage of the component of the component number #5 from the trail information. Next, the information management apparatus 100 of the supplier SP2 calculates a cumulative value V5 up to the manufacturing stage of the component of the component number #5 from the calculated single-unit value and the cumulative value of the upstream suppliers (step S6).

Next, the information management apparatus 100 of the supplier SP2 generates a random number r5 and calculates a cumulative value commitment CV5 of the cumulative value V5 by using the cumulative value V5 and the commitment function for the random number r5 (step S7).

Next, the information management apparatus 100 of the supplier SP2 generates a proof P5 as the cumulative value proof that is the zero-knowledge proof that proves the legitimacy of the cumulative value V5 (step S8).

Next, the information management apparatus 100 of the supplier SP2 generates a proof P5' as the cumulative value calculation proof that is the zero-knowledge proof which proves that the calculation of the cumulative value V5 is performed based on the correct cumulative value V3 in the upstream supplier SP1 (step S9).

After that, the information management apparatus 100 of the supplier SP2 executes a component transaction Tr1= (LINKb, CV5, proof P5, proof P5') with the upstream component link commitment LINKb, the cumulative value commitment CV5, the proof P5, and the proof P5' set as the arguments.

The component registration smart contract 301 of the blockchain 300 obtains a cumulative value commitment list 311 that is a list of the existing cumulative value commitments from the information registered in the blockchain 300. Here, the cumulative value commitment CV5 has not yet been registered, and the cumulative value commitment list 311 includes the cumulative value commitments CV1 to CV4. The component registration smart contract 301 of the blockchain 300 also obtains a cumulative value commitment list 312 that is the list of the upstream component link commitments from the information registered in the blockchain 300. Here, the upstream component link commitment LINKb has not yet been registered, and the cumulative value commitment list 312 includes an upstream component link commitment LINKa having been registered by any one of the suppliers 10. The component registration smart contract 301 verifies that the proof P5 and the proof P5' are true. The component registration smart contract 301 confirms that the upstream component link commitment LINKb does not exist in the cumulative value commitment list 312. The component registration smart contract 301 registers in the blockchain 300 the component information 302 of the component number #5 including the upstream component link commitment LINKb, the cumulative value commitment CVS, the proof P5, and the proof P5'.

Thus, the information management apparatus 100 of the supplier SP2 may collectively register in the blockchain 300 the upstream component link commitment LINKb, the cumulative value commitment CV5, the proof P5, and the proof P5' (step S10).

In this case, the proof P5' proves that the cumulative value commitment generated by using the same random number r3 as that of the upstream component link commitment LINKb exists in the cumulative value commitment list 311 while the cumulative value commitment CV3 remains concealed.

In a case where the relationship between the cumulative value commitment CV3 and the component of the component number #5 is not concealed, the cumulative value commitments CV3 and CV5 and the proof P5 are the arguments of a component transaction Tr. For example, this is represented as Tr=(CV3, CV5, proof P5). In this case, the relationship between the components is directly described in the component transaction Tr. Thus, the topology information of the supply chain is in a state of being easily grasped by a third party.

In contrast, in the supply chain system 1 according to the present embodiment, the component transaction Tr1= (LINKb, CVS, proof P5, proof P5') in which the relationship between the cumulative value commitment CV3 and the component of the component number #5 is concealed is used. This allows the legitimacy of the cumulative value V5 to be proved by the LINKb while the relationship between the components remains concealed.

Figure 4:
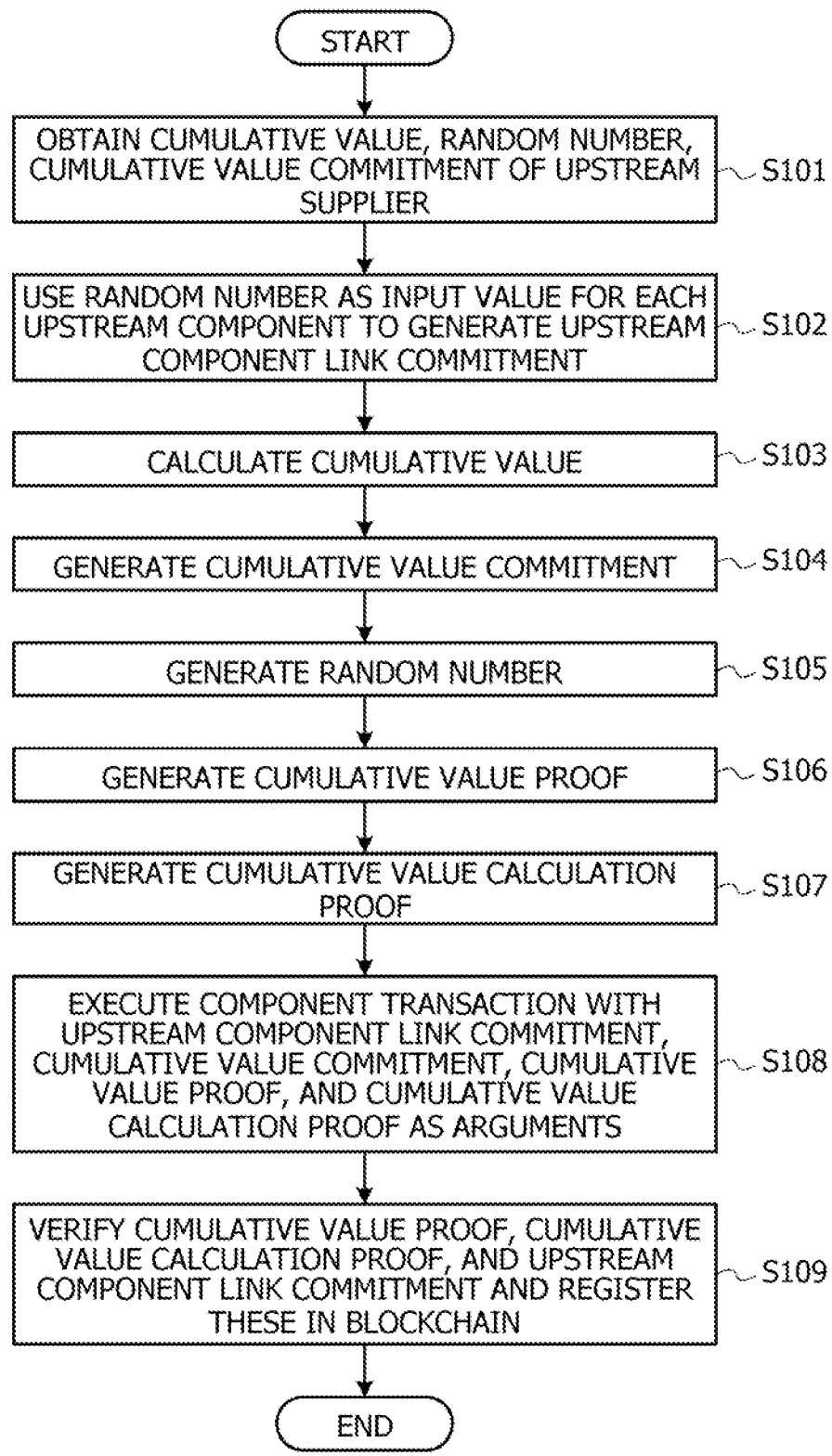
FIG. 4 is a flowchart of the topology information concealing process.

FIG. 4 is a flowchart of the topology information concealing process. Next, referring to FIG. 4, a flow of the topology information concealing process performed by the information management apparatus 100 in the supply chain system 1 according to the present embodiment example will be described.

The data obtaining unit 101 obtains from the blockchain 300 the existing cumulative value commitments including the cumulative value of the upstream suppliers, the upstream random number, and the upstream cumulative value commitment (step S101).

The upstream component link commitment generation unit 104 uses the random number as the input value to generate the upstream component link commitment by using the commitment function for each upstream component obtained from the data obtaining unit 101 (step S102).

With the trail information, the cumulative value calculation unit 106 calculates the single-unit value of the stage performed by its own supplier Next, the cumulative value calculation unit 106 adds the single-unit value in its own stage to the cumulative value of the upstream suppliers to calculate the cumulative value from the most upstream stage to its own stage (step S103).

The cumulative value commitment generation unit 105 uses the commit function to generate the cumulative value commitment for the cumulative value calculated by the cumulative value calculation unit 106 (step S104).

The cumulative value proof generation unit 107 generates the random number for the cumulative value calculated by the cumulative value calculation unit 106 (step S105).

The cumulative value proof generation unit 107 uses the generated random number, the trail information, the cumulative value of the upstream suppliers, and upstream random number to generate the cumulative value proof that is the zero-knowledge proof indicating that the cumulative value calculated by the cumulative value calculation unit 106 is a legitimate value (step S106).

The cumulative value calculation proof generation unit 102 receives the input of the upstream random number and each of the existing cumulative value commitments from the data obtaining unit 101. The cumulative value calculation proof generation unit 102 also receives the input of the upstream component link commitment from the upstream component link commitment generation unit 104. The cumulative value calculation proof generation unit 102 further receives the input of the cumulative value commitment obtained by concealing the cumulative value from the cumulative value commitment generation unit 105. Next, the cumulative value calculation proof generation unit 102 uses the upstream random number, the upstream component link commitment, each of the existing cumulative value commitments, and the cumulative value commitment generated by the cumulative value commitment generation unit 105 to generate the cumulative value calculation proof (step S107).

The registration unit 103 executes the component transaction with the upstream component link commitment, the cumulative value commitment, the cumulative value proof, and the cumulative value calculation proof set as the arguments (step S108).

Upon receiving the registration request from the information management apparatus 100, the component registration smart contract 301 verifies the upstream component link commitment, the cumulative value proof, and the cumulative value calculation proof. For example, the component registration smart contract 301 verifies that the cumulative value proof and the cumulative value calculation proof are true and that the upstream component link commitment is not registered in an upstream component link commitment list. In a case where these two conditions may be confirmed, the component registration smart contract 301 registers in the blockchain 300 the upstream component link commitment, the cumulative value commitment, the cumulative value proof, and the cumulative value calculation proof (step S109).

As described above, the information management apparatus in the supply chain system according to the present embodiment example conceals the topology information of the supply chain and transmits the cumulative value up to its own stage to the downstream stage. Thus, disclosure of the topology information of the supply chain to an unidentified number of participants may be suppressed. For example, an upstream supplier may conceal a transaction relationship with a downstream supplier. In contrast, a downstream supplier may conceal a transaction relationship with an upstream supplier. Thus, estimation of the scale of the supply chain, tracing of the relationship between the suppliers in combination with an analysis of the network layer, and the like may be suppressed. Accordingly, privacy in the supply chain related to each supplier and the entire supply chain may be protected. When the upstream component link commitment, which is the information on the link to the concealed upstream component, is recorded in the blockchain, tampering of the parent-child relationship afterward or duplicate use of the component may be suppressed.

Hardware Configuration

Figure 5:
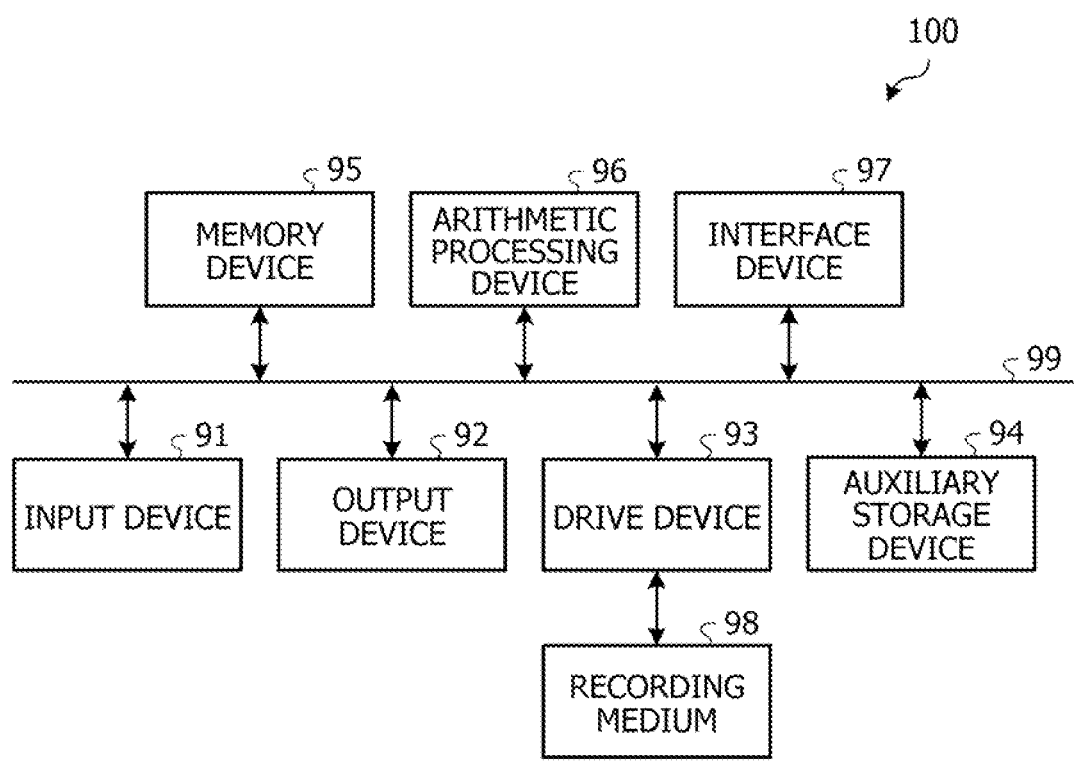
FIG. 5 is a hardware configuration diagram of the information management apparatuses.

FIG. 5 is a hardware configuration diagram of the information management apparatuses. Next, referring to FIG. 5, the hardware configuration of the information management apparatus 100 according to the embodiment example will be described.

The information management apparatus 100 according to the present embodiment is an information processing apparatus that includes an input device 91, an output device 92, a drive device 93, an auxiliary storage device 94, a memory device 95, an arithmetic processing device 96, and an interface device 97. These devices are coupled to each other via a bus 99.

The input device 91 is a device for inputting various types of information, and the output device 92 is a device for outputting various types of information. The interface device 97 includes a local area network (LAN) card or the like and is used for coupling to the network.

An information concealing program included in the information management apparatus 100 is at least a subset of various types of programs included in the information management apparatus 100.

These programs are provided, for example, through distribution of a recording medium 98, downloading from the network, or the like. As the recording medium 98 in which these programs are recorded, any of various types of recording media may be used such as a recording medium in which information is optically, electrically, or magnetically recorded like, for example, a compact disc read-only memory (CD-ROM), a flexible disk, or a magneto-optical disc, semiconductor memory in which information is electrically recorded such as a ROM or a flash memory, and the like.

When the recording medium 98 in which these programs are recorded is set in the drive device 93, the information concealing program is installed in the auxiliary storage device 94 from the recording medium 98 via the drive device 93. The information concealing program downloaded from the network is installed in the auxiliary storage device 94 via the interface device 97.

The auxiliary storage device 94 stores the installed programs, files to be used, data, and the like. The arithmetic processing device 96 reads the various types of programs from the auxiliary storage device 94 at the start of the information management apparatus 100 and loads and stores the read programs in the memory device 95. The arithmetic processing device 96 executes the programs stored in the memory device 95 to realize the functions of the units exemplified in FIG. 2 including the data obtaining unit 101, the cumulative value calculation proof generation unit 102, the registration unit 103, the upstream component link commitment generation unit 104, the cumulative value commitment generation unit 105, the cumulative value calculation unit 106, and the cumulative value proof generation unit 107.

The supply chain system described in the above embodiment example is applicable to any supply chain in which an item obtained from an upstream stage is processed, an added value is added to the item, and the item is passed to a downstream stage. For example, examples of the supply chain to which the above-described supply chain system is applicable include a supply chain in which a product is manufactured by adding components of a machine, a supply chain related to such software in which sub-components are sequentially added in individual stages, and so forth. Other examples of an applicable supply chain may include, for example, a supply chain related to such publishing in which a document is arranged and passed to the next.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an information concealing program for causing a computer to execute processing in a predetermined stage of a plurality of stages included in a supply chain, the processing comprising:
obtaining, from an immediately upstream stage, a first random number and a first cumulative value, the first random number being a random number used to generate a first cumulative value commitment, the first cumulative value commitment being a cumulative value commitment obtained by concealing the first cumulative value that is from a most upstream stage to the immediately upstream stage;
generating, based on the first random number, an upstream component link commitment information obtained by concealing information indicative of a relationship between the immediately upstream stage and the predetermined stage;
calculating, based on the first cumulative value, a second cumulative value that is from the most upstream stage to the predetermined stage;
generating a cumulative value calculation proof information that indicates that the second cumulative value is calculated by using the correct first cumulative value and that is a zero-knowledge proof based on the upstream component link commitment information; and
causing the upstream component link commitment information and the cumulative value calculation proof information to be recorded in a blockchain.

2. The non-transitory computer-readable recording medium according to claim 1, wherein
the generating of the cumulative value calculation proof information includes generating the cumulative value calculation proof information by using the first random number, the upstream component link commitment information, and a cumulative value commitment information that includes the existing first cumulative value commitment information in the blockchain.

3. The non-transitory computer-readable recording medium according to claim 1, wherein
the generating of the cumulative value calculation proof information includes generating the cumulative value calculation proof information that is the zero-knowledge proof that indicates that the second cumulative value is calculated based on any one of a plurality of correct cumulative values already recorded in the blockchain, the plurality of correct cumulative values including the correct first cumulative value calculated in the immediately upstream stage concealed by using the upstream component link commitment information.

4. The non-transitory computer-readable recording medium according to claim 1, the processing further comprising:
- generating a second random number related to the second cumulative value;
- generating a second cumulative value commitment information obtained by concealing, based on the second random number, the second cumulative value;
- generating a cumulative value proof information that is a zero-knowledge proof based on the second cumulative value commitment information and that indicates legitimacy of the second cumulative value; and
- causing the second cumulative value commitment information and the cumulative value proof information to be recorded in the blockchain.

5. An information concealing method implemented by a computer of performing processing in a predetermined stage of a plurality of stages included in a supply chain, the information concealing method comprising:
- obtaining, from an immediately upstream stage, a first random number and a first cumulative value, the first random number being a random number used to generate a first cumulative value commitment, the first cumulative value commitment being a cumulative value commitment obtained by concealing the first cumulative value that is from a most upstream stage to the immediately upstream stage;
- generating, based on the first random number, an upstream component link commitment obtained by concealing information indicative of a relationship between the immediately upstream stage and the predetermined stage;
- calculating, based on the first cumulative value, a second cumulative value from the most upstream stage to the predetermined stage;
- generating a cumulative value calculation proof that indicates that the second cumulative value is calculated by using the correct first cumulative value and that is a zero-knowledge proof based on the upstream component link commitment; and
- causing the upstream component link commitment and the cumulative value calculation proof to be recorded in a blockchain.

6. An information management apparatus of performing processing in a predetermined stage of a plurality of stages included in a supply chain, the information manage apparatus comprising:
- a memory; and
- a processor coupled to the memory, the processor being configured to perform processing including:
- obtaining, from an immediately upstream stage, a first random number and a first cumulative value, the first random number being a random number used to generate a first cumulative value commitment, the first cumulative value commitment being a cumulative value commitment obtained by concealing the first cumulative value that is from a most upstream stage to the immediately upstream stage,
- generating, based on the first random number, an upstream component link commitment obtained by concealing information indicative of a relationship between the immediately upstream stage and the predetermined stage,
- calculating, based on the first cumulative value, a second cumulative value from the most upstream stage to the predetermined stage,
- generating a cumulative value calculation proof that indicates that the second cumulative value is calculated by using the correct first cumulative value and that is a zero-knowledge proof based on the upstream component link commitment, and
- causing the upstream component link commitment and the cumulative value calculation proof to be recorded in a blockchain.

* * * * *